United States Patent [19]

Fouts et al.

[11] Patent Number: 4,622,205

[45] Date of Patent: Nov. 11, 1986

[54] ELECTROMIGRATION LIFETIME INCREASE OF LEAD BASE ALLOYS

[75] Inventors: David P. Fouts, Stanfordville; Devandra Gupta, Ossining; Paul S. Ho, Chappaqua; Jasvir S. Jaspal, Poughkeepsie; James R. Lloyd, Jr., Fishkill; James M. Oberschmidt, Poughkeepsie; Kris V. Srikrishnan, Wappingers Falls; Michael J. Sullivan, Red Hook, all of N.Y.

[73] Assignee: IBM Corporation, Armonk, N.Y.

[21] Appl. No.: 722,631

[22] Filed: Apr. 12, 1985

[51] Int. Cl.$^4$ .............................................. C22C 11/06
[52] U.S. Cl. ................................... 420/566; 420/570; 420/573
[58] Field of Search ............... 420/563, 566, 570, 571, 420/573, 590; 148/400

[56] References Cited

U.S. PATENT DOCUMENTS 3,600,164  7/1971  Harvey ................................. 420/570

FOREIGN PATENT DOCUMENTS 200546  11/1983  Japan ................................... 420/573

OTHER PUBLICATIONS

Ghandi, *VLSI Fabrication Principles,* John Wiley and Sons, 1983, pp. 448–449.

*Primary Examiner*—L. Dewayne Rutledge
*Assistant Examiner*—Robert L. McDowell
*Attorney, Agent, or Firm*—Perman & Green

[57] ABSTRACT

Electromigration activity is decreased and lifetime is extended in solder stripes employed as conductors and terminals on microelectronic devices by forming an alloy of a solute element, such as copper, with tin in a lead/tin solder and providing a substantially uniform distribution of particles of the intermetallic compound in the solder. The concentration of the solute element is maintained at less than about three times the tin concentration and less than about 10% of the amount of the solder.

12 Claims, No Drawings

ELECTROMIGRATION LIFETIME INCREASE OF LEAD BASE ALLOYS

BACKGROUND OF THE INVENTION

This invention relates to increasing the electromigration resistance of lead base alloys and, more particularly, to increasing the electromigration resistance of lead/tin solders.

Metal conductors carrying a high current density such as those necessary for practical solid state microelectronic configurations are susceptible to a current-induced mass transport failure mechanism, in which removal of material from one or more locations in the current path and build-up of material at one or more other locations in the current path occurs. Such mass transport phenomenon is termed "electromigration", and results in early failure of devices, either due to an open circuit caused in the current-carrying path as a consequence of the removal of material or to a short circuit formed as a consequence of build-up of material between the current-carrying path and an adjacent conductor.

For example, in the fabrication of C-4 terminals (C-4 is a designation for controlled collapse chip connection), a wettable metal area (typically a circle about 0.1 mm (0.005 inch) in diameter, although other sizes and geometries may be employed) is evaporated onto a dielectric through holes in a previously-prepared metal mask. The wettable metal area is called the BLM (ball limiting metallurgy) and is formed of layers of Cr-Cu-Au, with a total thickness of about 1 micrometer. After the BLM is formed, Pb-Sn solder (typically about 5% Sn) is evaporated through the metal mask and the solder is then reflowed (i.e., melted) to form the ball. During reflow, tin from the solder and copper from the BLM react to form $Cu_3Sn$ plus a small amount of $Cu_6Sn_5$. During the initial reflow and subsequent of reflows to join to a substrate, some of the $Cu_3Sn$ and $Cu_6Sn_5$ spalls (i.e., flakes off) into the liquid solder where it is trapped upon solidification. The resulting $Cu_3Sn+Cu_6Sn_5$ particle distribution in the solder due to spalling is non-uniform. As a consequence, such a non-uniform distribution of the copper/tin intermetallic compounds in the lead/tin solder can increase electromigration damage in the $C_4$ content.

Accordingly, it is an object of the invention to reduce the electromigration activity in a lead-base alloy.

It is another object of the invention to reduce the electromigration activity in a lead/tin solder employed in solder stripe terminations.

It is yet another object of the invention to provide a substantially uniform distribution of particles of an intermetallic compound in a lead/tin solder so as to reduce electromigration activity therein.

SUMMARY OF THE INVENTION

In accordance with the invention, a method is provided for reducing electromigration activity and extending the lifetime of solder connections by forming a substantially uniform distribution of a small quantity of a solute element in lead-base alloys, such as a lead/tin solder. Solute elements are those elements which form an intermetallic alloy with tin, in the case of lead/tin solders, and include copper, silver, gold and the rare earth elements.

In particular, the method comprises forming in a lead/tin solder an intermetallic alloy of copper with tin. The intermetallic alloy comprises primarily $Cu_3Sn$ (plus small amounts of $Cu_6Sn_5$). The copper concentration in the solder is less than about three times the tin concentration and ranges from an amount effective to reduce the electromigration activity—at least about 0.5%—to less than about 10% of the amount of the solder. The foregoing method yields a novel composition of matter having the composition and characteristics noted above.

DETAILED DESCRIPTION OF THE PREFERRED EMBODIMENT

Electromigration activity resulting from electron flow and the occurrence of sites of flux divergence in a lead/tin solder causes open circuits or shorts as material is moved under the influence of an electrical current. Since the lead/tin solder contains about 5% tin, most of the material transported comes about by diffusion of lead. At the device operating temperature in the range of 50° to 90° C., the mass transport is dominated by diffusion along grain boundaries.

In accordance with the invention, the grain boundary diffusion and electromigration activity in a lead/tin solder terminal has been found to be substantially reduced by forming an intermetallic alloy of copper with tin in the lead/tin solder. Addition of 3.5 wt. % copper to the Pb-95 wt Sn solder has been found to be effective in reducing the grain-boundary diffusion of Pb by a factor of ten (see Example 2). The intermetallic alloy is primarily $Cu_3Sn$, although it appears that an indefinitely small amount of $Cu_6Sn_5$ detectable by x-rays is also formed at the same time. The $Cu_6Sn_5$ forms during cooling from the reflow temperature. The amount is dependent on the cooling rate but the amount of $Cu_6Sn_5$ should be less than 10% of the total amount of intermetallic, i.e. ($Cu_3Sn+Cu_6Sn_5$). The copper/tin alloy is formed under conditions such that the copper concentration in the solder is less than about three times the tin concentration and ranges from an amount effective to reduce the electromigration activity—at least about 0.5%—to less than about 10% of the amount of the solder. As a consequence of the inventive approach, the lifetime of solder stripes is accordingly extended.

Thus, by adding copper to the solder itself, the formation and non-uniform distribution of the copper/tin intermetallics arising from the spalling of the copper from the BLM is prevented. In one preferred embodiment, $Cu_3Sn$ is introduced into the solder by codepositing copper with the lead/tin. This may be done, for example, by co-evaporating copper with lead/tin (or lead) from a second evaporation source. This is conveniently done either by evaporating pure copper along with lead/tin or, since copper and tin have very similar vapor pressures, by evaporating lead from one source and, substantially simultaneously, evaporating copper/tin from another source. Composition control is achieved by carefully measuring the amount of the material to be evaporated and operating both sources to completion, with the initial copper content in the lead/tin alloy being set at about 0.5%, this being the minimum amount that apparently reduces the electromigration activity. Some upward adjustment of this value might be required, however, depending upon the amount of tin in the lead/tin solder and the structure of the solder following subsequent processing.

A substantial advantage of the co-evaporation method is that a very large number of very small $Cu_3Sn$ intermetallic particles are formed. As is well-known, in evaporating a lead/tin composite, the tin evaporates after the lead has evaporated and forms a cap on the lead; this is a consequence of the much lower vapor pressure of tin compared to lead. Employing a second source of copper during the deposition of lead/tin permits co-deposition of the copper with almost pure lead during most of the deposition. Since, as is known from the Cu-Pb binary phase diagram, lead and copper are mutually insoluble in solid state and do not react, then copper forms many extremely fine particles in the lead matrix. The particle size depends on temperature and evaporation rate, and ranges from several hundred Angstroms to several micrometers.

Upon reflow, the fine copper particles act as heterogeneous sites for the formation of $Cu_3Sn$ (and $Cu_6Sn_5$), which solidifies before the lead/tin. Without subscribing to any particular mechanism, it appears that, at least in systems having a relatively low concentration of copper, most of the intermetallic particles tend to be formed at the grain boundaries in the final solidified structure. The diffusion (electromigration) that is being reduced in accordance with the invention generally occurs along the grain boundary at the temperature of use. It is thus considered important to have at least the grain boundaries uniformly filled. On the other hand, it appears that at higher concentrations of copper, on the order of a few percent, the distribution of the copper/tin intermetallic compounds is substantially uniform throughout the solder. Whether the copper/tin intermetallic particles are substantially uniformly distributed along the grain boundaries or throughout the grains themselves or some combination thereof is not material, other than that of the distribution of particles fall into one of the foregoing patterns.

As a consequence of the method of the invention, the $Cu_3Sn$ content on the solder is increased without affecting the BLM structure, and permits use of a thin copper BLM without decreasing the electromigration resistance. Improvement of electromigration resistance manifests itself in that for a constant copper thickness in the BLM, the electromigration resistance increases as more reflows are performed. During each reflow cycle, $Cu_3Sn$ spalls from the BLM and decreases the $Cu_3Sn$ thickness at the BLM while increasing the amount of $Cu_3Sn$ in the solder near the BLM. Spalling occurs because the grain boundaries of Cu and/or $Cu_3Sn$ dissolve preferentially into the liquid solder, thus releasing a particle into the melt. Thus, increased electromigration resistance is obtained with (essentially) thinner copper in the BLM.

The copper concentration in the solder is maintained at less than about three times the tin concentration in order to avoid using up all the tin in forming the Cu/Sn alloy. Further, the amount of copper is at least that effective in reducing the electromigration activity; at least about 0.5% copper in a 95 Pb/5 Sn solder has been found to be sufficient in this regard. The maximum amount of copper is less than about 10% of the amount of the solder in order to avoid adversely affecting the mechanical properties of the solder. Preferably, the amount of copper ranges from about 3 to 4% of of the total amount of the solder, and most preferably about 3.5%. In this range, the grain boundary diffusivity of lead is reduced by a factor of ten at about 126° C.

The fine, substantially uniform distribution of copper into the solder may be achieved in a variety of ways: co-evaporation of copper with lead/tin (or lead), as discussed above, addition of particles of copper to a lead/tin melt, co-plating of the components, ion implantation and solid state diffusion are examples of some of the ways that the disired distribution may be achieved. In adding particles of copper to a lead/tin melt, smaller particles, on the order of about 1 micrometer, would be employed for small conductors that are only reflowed for a short time. For larger conductors that will spend more time in the molten state, larger particles would be employed. The structure can then be heat-treated (even at room temperature, such as with airplane alloy) and/or melted and solidified.

The substantially uniform distribution of the copper/tin intermetallic particles in the solder is essential, since an uneven distribution results in an excessive electromigration of those locations that do not have the copper/tin intermetallic particles. Accordingly, a greater current density and temperature (due to Joule heating) occurs at those locations that do not have such intermetallic particles, after some electromigration has taken place effectively reducing the area available for current conduction. Consequently, uneven particle distribution results in early failures. Without subscribing to any particular theory, it appears that the presence of $Cu_3Sn$ (and possibly $Cu_6Sn_5$) fine particles in lead/tin solder acts to slow any grain boundary diffusion, thereby increasing the resistance to electromigration.

The lead-base composition suitably employed in the practice of the invention preferably is a lead/tin solder. Such compositions are typically 95% Pb, 5% Sn; however, other lead/tin compositions are expected to be suitably employed in the method of the invention. Further, the inventive method is useful for lead/bismuth ternary solders having a concentration of bismuth close to that of tin, e.g., 90/5/5 Pb/Sn/Bi.

While the use of copper has been shown to reduce electromigration in lead/tin solders, other elements having properties similar to those of copper, such as silver and gold or any other element which will form one or more intermetallic compounds with tin, are also expected to provide a similar improvement in these solders. Examples of such other elements include the rare earth elements.

While this disclosure is primarily directed to the improvement in electromigration activity in C-4 terminals, the method of the invention is also suitably employed to enhance Josephson electrodes and reduce Soret effects (diffusion in a temperature gradient). The invention acts to slow diffusion in grain boundaries; such effect slows electromigration and also thermomigration.

EXAMPLES

Example 1

Electromigration data was accumulated for C-4 terminals as a function of copper thickness. These data are shown below. The failure rate was measured at 1.1 amps/C-4 terminal at 150° C.

| Cu Thickness in BLM, Å | Failure Rate, %/K hrs @ 100 K hrs |
|---|---|
| 10,000 | $4.4 \times 10^{-10}$ |
| 5,000 | $2.1 \times 10^{-6}$ |
| 2,500 | $1.3 \times 10^{-4}$ |

As can be seen, the failure rate increases by a factor of $10^6$ as the copper thickness decreases from 10,000 Å to 2,500 Å.

Example 2

Grain boundary diffusion studies of the $Pb^{203}$ radioactive tracer were carried out in a lead/tin alloy, with the tin concentration maintained at 5% and copper substituted for lead. The temperature was 126° C. The results are shown below:

| Copper Addition, wt % | Diffusivity, (126° C.) $cm^2/sec$ |
|---|---|
| 0 | $5.2(\pm 0.8) \times 10^{-15}$ |
| 0.3 | $2.8(\pm 0.8) \times 10^{-15}$ |
| 1.4 | $1.4(\pm 2.0) \times 10^{-15}$ |
| 3.5 | $5.2(\pm 0.8) \times 10^{-16}$ |

As can be seen, the grain boundary diffusion of lead in a lead/tin alloy containing 5% tin is reduced by a factor of 10 at 126° C. when 3.5% copper is added.

It is to be understood that the above-described embodiments of the invention are illustrative only, and that modifications thereof may occur to those skilled in the art. Accordingly, this invention is not to be regarded as limited to the embodiments as disclosed herein, but is to be limited only as defined by the appended claims.

Having thus described our invention, what we claim as new, and desire to secure by Letters Patent is:

1. A method for reducing electromigration activity in terminations including lead-base/tin alloys evaporated onto ball limiting metallurgy formed of copper containing alloys comprising adding a solute element to the said lead-base/tin alloy in an amount of at least about 0.5%, the solute element being selected from the group consisting of copper, silver, gold and the rare earth elements.

2. The method of claim 1 in which said amount ranges from about 3 to 4%.

3. The method of claim 2 in which said amount is about 3.5%.

4. A method for reducing electromigration activity and extending the lifetime of terminations in microelectronic devices, said terminations including lead/tin solders evaporated onto ball limiting metallurgy formed of copper containing alloys comprising:
   (a) forming an alloy of a solute element selected from the group consisting of copper, silver, gold and rare earth elements with a lead/tin solder to form an intermetallic alloy with tin, the concentration of said solute element being less than about three times the tin concentration and at least an amount effective for reducing electromigration activity in said solder; and
   (b) providing a substantially uniform distribution of said intermetallic compound in said solder.

5. The method of claim 4 in which said concentration of said solute element ranges from about 0.5 to 10%.

6. The method of claim 4 in which said solute element comprises copper.

7. The method of claim 4 in which said intermetallic alloy consists essentially of $Cu_3Sn$ plus a trace amount of $Cu_6Sn_5$.

8. The method of claim 4 in which said lead/tin solder includes bismuth in about the same proportion as that of tin.

9. The method of claim 4 in which said lead/tin solder consists essentially of 95% Pb and 5% Sn and said solute element consists esssentially of copper.

10. The method of claim 9 in which said copper is present in an amount of about 3 to 4%.

11. The method of claim 10 in which said copper is present in an amount of about 3.5%.

12. The method of claim 9 in which substantially uniform distribution is achieved by co-evaporating copper with lead and tin and reflowing of the resulting copper-containing solder.

* * * * *